United States Patent
Katz et al.

(10) Patent No.: US 6,565,084 B1
(45) Date of Patent: May 20, 2003

(54) GAMES, AND METHODS FOR IMPROVED GAME PLAY IN GAMES OF CHANCE AND GAMES OF SKILL

(75) Inventors: Randall Mark Katz, Beverly Hills, CA (US); Gary Dawson, Tarzana, CA (US); Andrew Felsher, Calabasas, CA (US)

(73) Assignee: Milestone Entertainment, Beverly Hills, CA (US)

( * ) Notice: Subject to any disclaimer, the term of this patent is extended or adjusted under 35 U.S.C. 154(b) by 0 days.

(21) Appl. No.: 09/585,987

(22) Filed: Jun. 2, 2000

(51) Int. Cl.⁷ .............................................. A63B 71/00
(52) U.S. Cl. .................... 273/138.1; 273/269; 273/439; 463/9; 463/17; 463/40
(58) Field of Search .............................. 273/138.1, 269, 273/439; 463/17, 9, 40

(56) References Cited

U.S. PATENT DOCUMENTS

| | | | | |
|---|---|---|---|---|
| 3,873,092 A | * | 3/1975 | Fagan | 273/135 B |
| 5,035,422 A | * | 7/1991 | Berman | 273/439 |
| 5,074,566 A | | 12/1991 | Desbiens | |
| 5,112,050 A | * | 5/1992 | Koza et al. | 273/139 |
| 5,472,196 A | | 12/1995 | Rusnak | |
| 5,475,205 A | | 12/1995 | Behm et al. | |
| 5,513,852 A | | 5/1996 | Robinson | |
| 5,518,253 A | * | 5/1996 | Pocock et al. | 273/439 |
| 5,628,684 A | | 5/1997 | Bouedec | |
| 5,643,088 A | * | 7/1997 | Vaughn et al. | 463/40 |
| 5,721,583 A | | 2/1998 | Harada et al. | |
| 5,791,990 A | | 8/1998 | Schroeder et al. | |
| 5,813,913 A | * | 9/1998 | Berner et al. | 463/20 |
| 5,909,875 A | * | 6/1999 | Weingardt | 273/269 |
| 5,931,467 A | | 8/1999 | Kamille | |
| 5,936,661 A | | 8/1999 | Trew | |
| 6,102,395 A | * | 8/2000 | Such | 273/139 |
| 6,102,400 A | * | 8/2000 | Scott et al. | 273/269 |
| 6,193,610 B1 | * | 2/2001 | Junkin | 463/20 |
| 6,203,011 B1 | | 3/2001 | Nulph | |
| 6,241,246 B1 | * | 6/2001 | Guttin et al. | 273/139 |
| 6,250,685 B1 | | 6/2001 | Walker et al. | |
| 6,267,376 B1 | | 7/2001 | Jenkins | |
| 6,322,446 B1 | | 11/2001 | Yacenda | |
| 2001/0019193 A1 | | 9/2001 | Gumina | |

FOREIGN PATENT DOCUMENTS

WO    WO 01/76704 A2    10/2001

OTHER PUBLICATIONS

Schwartz, David et al, "The Encyclopedia of TV Game-Shows", 3rd Edition.
WWW.geocites.com/TelevisionCity/1856/rules.htm, CARD SHARKS Apr. 24, 1978 pp. 1–3.

* cited by examiner

Primary Examiner—Benjamin H. Layno
Assistant Examiner—D Collins
(74) Attorney, Agent, or Firm—O'Melveny & Myers

(57) ABSTRACT

A variety of games and methods for enhancing game play are provided. In one aspect, a secondary or ancillary game is played in parallel with a first game, such as a lottery ball draw. Yet another game involves the selection of items which a player or participant believes had been selected by an audience as not being the most popular. In yet another aspect, an interstitial progressive sequencing of programming is provided, such as where a series of short segments are presented at differing times throughout an evening of prime time programming. Audience participation may be enhanced by permitting Internet access to the game system, and to permit remote users to play along as if they were in studio participants or part of the studio audience.

29 Claims, 3 Drawing Sheets

GAMES, AND METHODS FOR IMPROVED GAME PLAY IN GAMES OF CHANCE AND GAMES OF SKILL

FIELD OF THE INVENTION

These inventions relate to methods, an apparatus for their implementation, of unique player participation games, and for improved methods of play for games of skill and games of chance. More particularly, these inventions relate to new and improved games involving player participation in a broadcast medium, such as television, and in other communication medium, such as over the internet or other communications network.

BACKGROUND OF THE INVENTION

Play or participation games fall broadly under the categories of games of chance and games of skill. One of the main forms of games of chance are lotteries. By definition, a lottery involves the three elements of: 1) prize, 2) chance and 3) consideration. If these three elements are present, then the game is considered to be a lottery, and is typically then run by a governmental entity. In the United States, lotteries are typically run by the individual states, or collectively by a group of states. In other countries, it is typically the national government which runs the lottery. Countries and states attempt to strictly limit the game play to their geographic boundaries. For example, in Austria, while electronic access to the game may be available over the internet, or in order to play, the person must have a bank account in Austria, and be able to navigate the non-english menu.

Games have been conducted in any of a number of formats. Certainly, live, in person games have been performed. Yet other games have been played and broadcast over a broadcast medium, such as radio or television. Yet other games have been played through a more active communication medium, such as the telephone, or over a communication network such as the internet.

Various attempts have been made to provide game play over the internet. By way of example, the game show Jeopardy has been placed on the web at http://www.sony.com.

Various other attempts have been made to extend the general concept of gambling to broad communication media, such as the internet. For example, U.S. Pat. No. 5,800,268 entitled, "Method of Participating in a Live Casino Game from a Remote Location" has been asserted in a litigation in against an off shore corporation. The '268 patent discloses a system in which a player may participate in a live casino game from a location remote from the casino. A player interface station, such as a computer terminal or other special input device, is connected by a communication line to the casino. A second communication line is established from the casino to the player's financial institution. The player is presented with an image of an actual "live" game. The player then participates directly as if they were physically present at the casino. A wager is cleared with the players financial institution to insure adequate resources to cover the bet.

U.S. Pat. No. 4,845,739 to Ronald A. Katz is entitled, "Telephonic-Interface Statistical Analysis System". The patent describes various operating formats, including a format to be performed in association with television media. Specifically, in one embodiment, a real-time format is provided in which television viewers participate on a real-time basis in a game show for prizes. Expanded audience participation is achieved. Various levels of qualification are provided, such as where a child's television game format is utilized, parental clearance may be required. The use of personal identification numbers (pin numbers) is disclosed. In one implementation, the caller is prompted to identify which of the actual studio audience participants the caller will be aligned with. Additionally, the caller may be instructed to indicate the extent of a wager. As the game progresses, the individual player's accounts are credited or debited, thereby providing on-going accounting data. In yet another implementation, a non real-time operation is provided. Such a show might involve a quiz for callers based on their ability to perceive and remember occurrences within the show. Pre-registration is optionally utilized. In this implementation, a sequence or time clock would be utilized in order to limit or control individual interfaces to a specific time or geographic "window". In this way, the caller questions may be utilized across various time zones without the caller having obtained the question earlier than other callers within a given time zone.

Berman, U.S. Pat. No. 5,108,115 discloses a game show and method entitled "Interactive Game Show and Method for Achieving Interactive Communication Therewith". An interactive communication system is provided which permits individuals to electronically select at least one possible outcome of a plurality of outcomes of a future event. Successful contestants possibly share in a prize award associated with the event. A home audience of a televised game show may electronically communicate a series of random numbers using their touch tone telephone to participate in the show.

Recently, various governmental entities and trade organization have addressed the issue of game play over the internet. Congressman Kye has introduced a bill which would preclude the offering of internet based gaming, though permitting states to offer internet gambling. Consideration has been given to requiring that the state sponsored gaming be limited to an intranet, in an effort to limit those participating to persons physically resident within the states boundaries. Various international lottery organizations have promoted similar restrictions, namely, precluding the individuals offering of games of chance, and reserving that option exclusively to the state.

Various lottery formats are known to the art. In one classic format, a pre-determined number of tickets are provided with certain printed matter, such as numbers or other indicia, where the information is then obscured by a scratch off layer. By removing the layer and revealing the underlying information, the ticket holder may determine whether they have won or not. Various extensions have been made to a "virtual" scratch off ticket where no physical ticket is provided.

A conventional lottery proceeds as follows. First, a series of numbers are selected, either by the player or by some automated selection system, such as by computer. Upon the occurrence of a pre-determined event, such as on a set date and time, numbers are randomly chosen. Both mechanical methods, such as selection of ping-pong balls bearing numeric designations, or electronic means such as through a random number generator, may be utilized. The selected numbers are then provided to the participants, such as through a broadcast medium like newspapers, radio and television. Finally, the holder or holders of winning tickets then present their ticket for payment.

In yet another aspect of game play, a typical television presented game show lasts on the order of one half hour.

Various shorter format games or shows have been utilized, for example, a football based advertisement or game has been presented by IBM during televised football games under the name "You Make The Call". Yet other shorter version games have been presented over web TV or on the Game Show Network.

Despite the wide spread participation in various forms of game play, as well as the suggestions for implementing those games on a mass communication network, such as through the telephone or internet, the possibility for new games, or improved game play exists.

SUMMARY OF THE INVENTION

Various interactive game show formats and methods for game play are provided. In one embodiment, a second or ancillary game is played in parallel with a first or primary game. By way of example, in association with a first game comprising a lottery number ball draw, a second game may involve a selected player's guessing whether the next ball draw will be of a higher or lower number, or odd or even or the like.

Various aspects of enhanced games play and novel game are disclosed. In a first aspect, the game play method and system provides for the playing or running of a parallel game or ancillary game along with a first or primary game. For example, during the real time ball draw for a lottery, the improved game play would involve running a parallel or ancillary game along with the ball draw. One implementation would involve a first ball draw, followed then by game play by a contestant such as predicting whether the next ball drawn would be of a higher or lower number, or would be odd or even.

In one implementation, the master of ceremonies would advise the player which of these options had a better probability of being the outcome, thereby making the ancillary game more a game of chance as opposed to a game of skill. Optionally, scoring may be done, such as where one player or audience participant is scored or ranked relative to another player or participant.

In yet another aspect, the game play includes the use of contestant game play to determine lottery numbers. For example, a contestant may be blind folded or otherwise be made unable to see various options. The person then selects from among the various options as the means by which the random lottery numbers are drawn. One example could comprise a blind folded contestant selecting objects.

In yet another aspect, this invention relates to an interstitial game show. Main or regular programming, such as is broadcast on a given evening during prime time on a broadcast network would additionally include multiple interspersed, typically short, segments relating to game play. In the preferred embodiment, the game play would be for a relatively short period of time, for example, 1 to 2 minutes. For example, at 8:00 an initial round may be played prior to the beginning of prime time programming. Normal programming would then resume through the remainder of the 8:00 hour. At 9:00, a second short segment may be played. The play may continue at later times, such as to culminate at a show at 11:00. Preferably, the short segments would not necessarily be shown at a predetermined or predeterminable time as far as the audience was concerned. In that way, viewers who wish to see the progression of the game segments would need to continue viewing that channel, or at least, return to the channel fairly frequently. Optionally, the game play my be progressive from one interstitial game segment to another. Players may be presented with the option of stopping play or continuing.

In yet another game format, the show would include a display having an underlying image, with that image being at least partially obscured by overlying image regions which differ from the underlying image region. A contestant would be given a time limit in which they would be presented with information relating to a suggestion or a clue relating to an overlying image region, which if the player responded correctly, would be removed so as to reveal that portion of the underlying image which was below the overlying image. The suggestion or clues may be related to the underlying image or may merely be unrelated suggestions or clues with respect to that particular overlying image region.

Yet another embodiment of game play provides for the repurposing of an existing taped game show. The previously recorded game show would be segmented into subsets of issues, for example, presentation of questions or answers (as in the case of Jeopardy), those issues would be presented to one or more players, a response would be received from those players, and the answer would be compared to the correct answer. Scoring would then rank players relative to one another or to indicate the amount of the prize.

In yet another game play implementation, one or more contestants would be presented with multiple images upon which predetermined data had been assembled. For example, images of five actresses may be presented to the player and the associated data would comprise opinion polling information as to whom the audience thought was the most attractive. The players would then play against each other to eliminate the images which they believe do not correspond to the most popular or number one response. The players would alternate until one player remained. In a second round, individual play, as opposed to play between contestants is utilized. Again, the player attempts to eliminate those answers which were other than the most popular answer of the audience.

In yet another aspect of enhanced game play, audience participation via an interactive video display, such as a computer connected over the Internet, or via an interactive television arrangement, may participate in the program.

Accordingly, it is an object of this series of inventions to provide for novel game play.

It is yet a further object of this invention to provide for enhanced modes of game play in association with existing forms of game play.

It is yet a further object of this invention to provide for the repurposing or repackaging of previously recorded game shows.

DETAILED DESCRIPTION OF THE PREFERRED EMBODIMENTS

Figure 1:
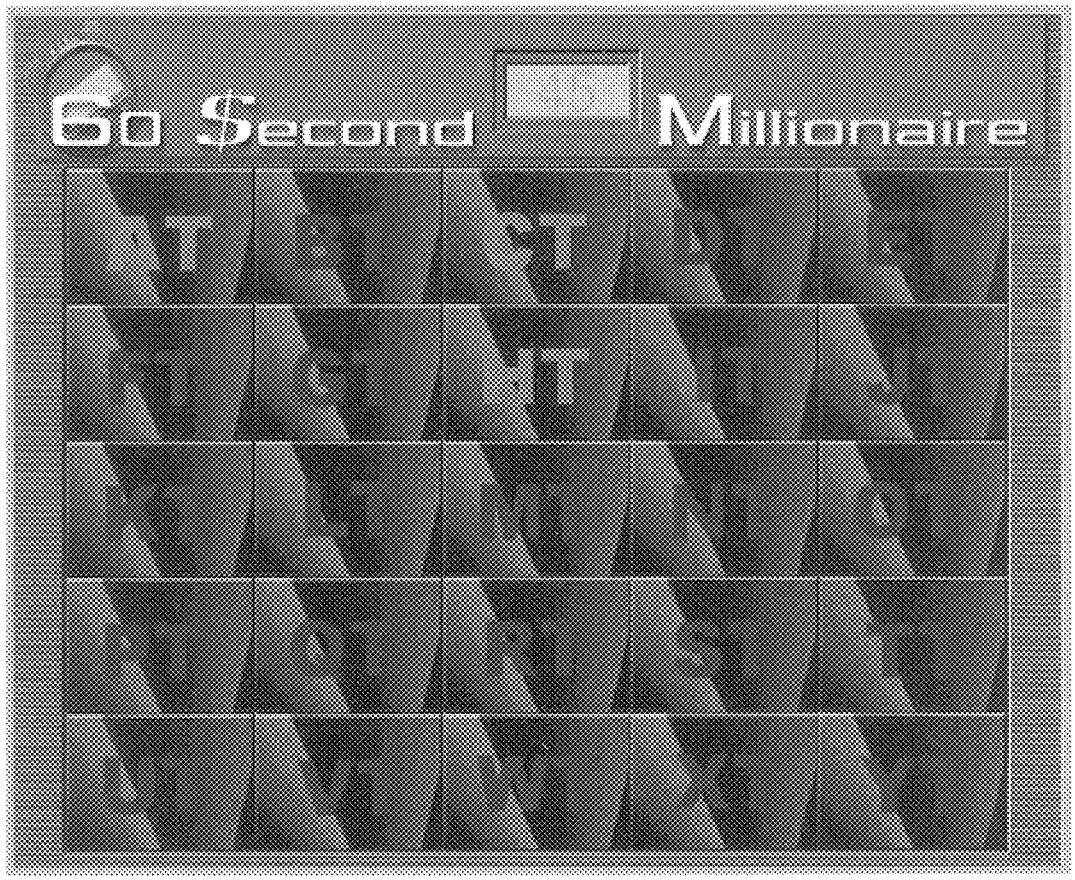
FIG. 1 shows the screen associated with an image presentation game in which obscuring portions are removed in response to correct answers.
Figure 2:
FIG. 2 is a drawing of an image with a word scramble.

FIG. 1 shows a screen image from a game show having a display with an underlying image. The title of the game, e.g., "60 $econd Millionaire" optionally involves a time limit and a time display. As shown, the time displayed is 45 seconds. An underlying image is obscured by one or more overlying images. As shown in FIG. 1, a 5×5 array of overlying obscuring images obscures the underlying images.

As shown, there are three pairs of initials, AT in the upper left hand corner of the array, CT in the first row, third column and HT in the second row, third column. As the caller is presented with questions, they may answer and, if their answer is correct, the overlying obscuring piece corresponding to that answer or question is then removed, thereby reviewing the underlying image in the region where the overlying obscuring portion had previously been presented.

Various interactive game show formats and methods for game play are provided. In one embodiment, a second or ancillary game is played in parallel with a first or primary game. By way of example, in association with a first game comprising a lottery number ball draw, a second game may involve a selected player's guessing whether the next ball draw will be of a higher or lower number, or odd or even or the like.

Various aspects of enhanced game play and novel game are disclosed. In a first aspect, the game play method and system provides for the playing or running of a parallel game or ancillary game along with a first or primary game. For example, during the real time ball draw for a lottery, the improved game play would involve running a parallel or ancillary game along with the ball draw. One implementation would involve a first ball draw, followed then by game play by a contestant such as predicting whether the next ball drawn would be of a higher or lower number, or would be odd or even.

In one implementation, the master of ceremonies would advise the player which of these options had a better probability of being the outcome, thereby making the ancillary game more a game of chance as opposed to a game of skill. Optionally, scoring may be done, such as where one player or audience participant is scored or ranked relative to another player or participant.

In yet another aspect, the game play includes the use of contestant game play to determine lottery numbers. For example, a contestant may be blindfolded or otherwise be made unable to see various options. The person then selects from among the various options as the means by which the random lottery numbers are drawn. One example could comprise a blind folded contestant selecting objects.

In yet another aspect, this invention relates to an interstitial game show. Main or regular programming, such as is broadcast on a given evening during prime time on a broadcast network would additionally include multiple interspersed, typically short, segments relating to game play. In the preferred embodiment, the game play would be for a relatively short period of time, for example, 1 to 2 minutes. For example, at 8:00 an initial round may be played prior to the beginning of prime time programming. Normal programming would then resume through the remainder of the 8:00 hour. At 9:00, a second short segment may be played. The play may continue at later times, such as to culminate at a show at 11:00. Preferably, the short segments would not necessarily be shown at a predetermined or predeterminable time as far as the audience was concerned. In that way, viewers who wish to see the progression of the game segments would need to continue viewing that channel, or at least, return to the channel fairly frequently. Optionally, the game play my be progressive from one interstitial game segment to another. Players may be presented with the option of stopping play or continuing.

In yet another game format, the show would include a display having an underlying image, with that image being at least partially obscured by overlying image regions which differ from the underlying image region. A contestant would be given a time limit in which they would be presented with information relating to a suggestion or a clue relating to an overlying image region, which if the player responded correctly, would be removed so as to reveal that portion of the underlying image which was below the overlying image. The suggestion or clues may be related to the underlying image or may merely be unrelated suggestions or clues with respect to that particular overlying image region.

Yet another embodiment of game play provides for the repurposing of an existing taped game show. The previously recorded game show would be segmented into subsets of issues, for example, presentation of questions or answers (as in the case of Jeopardy), those issues would be presented to one or more players, a response would be received from those players, and the answer would be compared to the correct answer. Scoring would then rank players relative to one another or to indicate the amount of the prize. In yet another game play implementation, one or more contestants would be presented with multiple images upon which predetermined data had been assembled. For example, images of five actresses may be presented to the player and the associated data would comprise opinion polling information as to whom the audience thought was the most attractive. The players would then play against each other to eliminate the images which they believe do not correspond to the most popular or number one response. The players would alternate until one player remained. In a second round, individual play, as opposed to play between contestants is utilized. Again, the player attempts to eliminate those answers which were other than the most popular answer of the audience.

In yet another aspect of enhanced game play, audience participation via an interactive video display, such as a computer connected over the Internet, or via an interactive television arrangement, may participate in the program.

Figure 3:
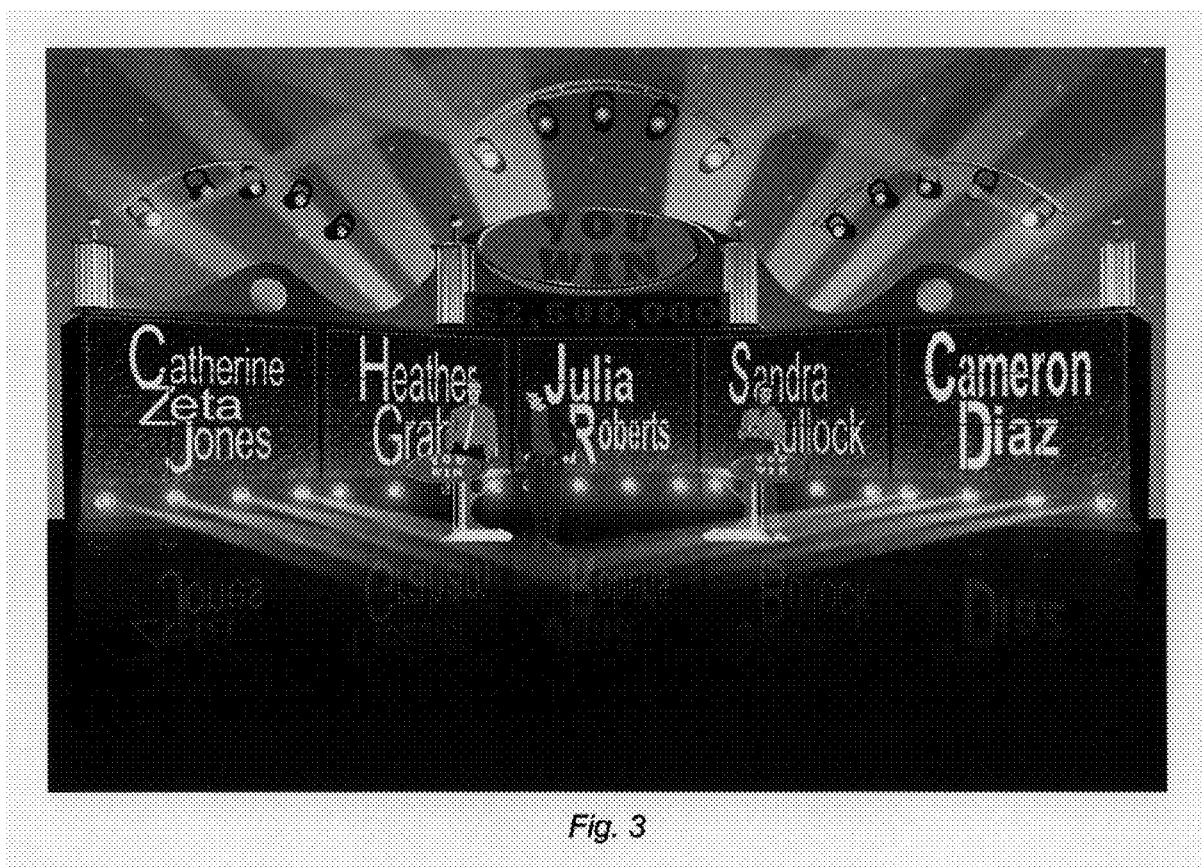
FIG. 3 is a depiction of a game show set for use with one version of the games disclosed herein.

The following comprises a detailed description of one implementation of a weekly game show utilizing various inventive aspects described herein. FIG. 3 shows a depiction of a possible set for the game show. Generally, two contestants and a Master of Ceremonies (MC) are placed at podiums. Large displays are provided on the set such that the in-studio audience may view the images. Optionally, the players may be additionally provided with monitors or other displays to aid in their viewing of the images. A display may be provided, such as to show the amount of money then available to be won, or to display other data, such as the number of participants still remaining. Such would be useful where there is significant audience participation, or participation by others via the internet or other computer based network.

Each week the show starts out with the introduction of the two contestants that will compete against each other and eventually have a chance to win, perhaps, the largest game show jackpot in television history.

We have thousands of telephone players that are also competing from home for their share of the money. These players have all called our telephone number during the week, and qualified to play on the program. On stage is a readout that shows the prize money building up, even during the broadcast. The phone players that remain in the game until the end of the show are patched in "live-on-tape" and have a shot at the money. For this example, let's assume that 25,000 people have qualified to participate in this week's show and the jackpot is up to $1.6 million.

Round One

The object of the studio game is to be the first player to reach $25,000 dollars. That player will go on to the end game for a chance to win thousands more, and perhaps hit the big jackpot! The first round starts with the in-studio players being asked an opinion question with 5 possible answers. Each of the 5 answers is displayed on a large video wall in a semi-circle onstage which creates the backdrop of our set. The first question is worth $1,000 dollars to the winner. For example:

Out of the following actresses, who is the sexiest?

Sandra Bullock, Elizabeth Hurley, Catherine Zeta Jones, Julia Roberts, Nicole Kidman.

The phone players vote for their favorite answer. The in-studio players take turns trying to eliminate the answers that they think are not the number 1 answer. The game is quite simply a kind of reverse "Family Feud." If a player mistakenly picks the number 1 answer, the opposing player will receive the $1,000 dollars. Additionally, if a player can successfully pick the last answer, leaving the number one answer, that player will receive the $1,000 dollars. The phone players who selected the number 1 answer are still in the game, and the others are eliminated. The studio players are shown another question worth $2,000 dollars and play continues in the same manner as before. Six questions in total are asked in the first round with the value going up by $1,000 dollars each time. The phone players are gradually whittled down to a few thousand by the end of the six questions.

Round Two—The Qualifying Round

This time the questions are played individually by a player instead of alternating between players. The player that is behind goes first. As before, a player must eliminate everything but the number 1 answer. For the first question, we stake a bank with $1,000 dollars. Every successful elimination will add $1,000 dollars to the bank. If the player eliminates every answer but the number 1 answer, they receive the money that has been built up in the bank. At any point the player mistakenly picks the number 1 answer, his/her opponent will get the money in the bank. The $2^{nd}$ question starts with a $2,000 dollar stake in the bank and each successful elimination adds $2,000 to the bank. The $3^{rd}$ question starts with 3000 and so on and so forth. The player that crosses the $25,000 dollar goal first will win the competition. The losing player gets parting gifts and does not keep the money accumulated during the game. Like the previous round, phone players who have picked the number 1 answer in this round will advance to the next round.

Speed Round

The speed round is played by the winning player. The player tries to answer as many questions as they can in sixty seconds. The questions always have two possible answers. For example:

Who was a better President?

Clinton or Reagan . . .

Have you eaten pizza in the last week?

Yes or no . . .

Have you ever milked a cow?

Yes or no . . .

As before, the phone players that give the majority answer will stay in the game. The first successful answer is worth $10,000 dollars to the in-studio player. If he/she gets the next question right, it is worth an additional $20,000 dollars, the next an additional $30,000 and so on. If the player guesses incorrectly, the total amount of money that they have accumulated up to that point is cut in half, and the next question starts back at the $10,000 dollar base amount. The player must then try to build back up his/her money. Let's assume, for example sake that at the end of the sixty seconds, the player has built up $120,000 dollars. We will also assume that there are 5 phone players left in the game.

The Final Challenge

At this point, the player is faced with a decision. He/she is shown a final question. For example:

Who would you rather have dinner with?

Bill Clinton, Bill Gates, Howard Stern, Robin Williams or Steven Spielberg?

The question was posed to a previously selected group in order to get the results.

The player can either stop and keep the money, or try for the jackpot. All the player must do is simply pick the number 1 answer.

If the player stops, he/she keeps 50% of the money that they have accumulated so far and we will split the remaining 50% amongst the phone players. We will speak to some of the players on the phone to find out whether they think the player should go for it or not. If the player decides to play for the jackpot, the phone players must also decide if they want to go for it too. Any phone player that does not wish to play can opt out of the game and keep their share of the money won thus far.

After the player decides what answer he/she believes is the number 1 answer, the host starts dramatically revealing the other answers one at a time until we get down to a 50—50 shot of winning. Then we see the players answer.

If the player wins, he/she will win 50% of the jackpot and the remaining phone players will win 50%. If the player loses, he/she will lose everything along with the phone players that participated and they will all receive parting gifts. The jackpot will then roll over to next week's show. When the jackpot is not hit for several weeks, the excitement level for the viewers and players will be incredible!

Although the foregoing invention has been described in some detail by way of illustration and example for purposes of clarity and understanding, it will be readily apparent to those of ordinary skill in the art in light of the teachings of this invention that certain changes and modifications may be made thereto without departing from the spirit or scope of the appended claims.

What is claimed:

1. A method for enhanced game play in association with generation of a plurality of random numbers comprising the steps of:

selecting a series of events to be compared to the sequential, random selection of numbers, wherein the events are selected from the group consisting of:

that a subsequent random number will be (1) higher or lower than a previously selected number and (2) odd or even, generating the plurality of random numbers, comparing the selection of the series of events with the plurality of random numbers, and determining a winner based on the number of positive comparisons from the preceding step.

2. The method of claim 1 wherein the generation of the plurality of numbers is for a lottery.

3. The method of claim 1 wherein the selection of random numbers is mechanical.

4. The method of claim 3 wherein the mechanical selection utilizes balls.

5. The method of claim 4 wherein the balls are ping-pong balls.

6. The method of claim 1 wherein the selection of numbers is electrical.

7. The method of claim 6 wherein the electrical selection includes a random number generator.

8. The method of claim 1 wherein the selection of the series of events comprises a game of chance.

9. The method of claim 8 wherein the game of chance involves a determination regarding the actions in the sequential, random selection of numbers.

10. The method of claim 1 wherein the game involves multiple players.

11. The method of claim 10 wherein the players are ranked according to a score.

12. The method of claim 1 further including the step of advising a contestant of the probability of an outcome of an upcoming event.

13. The method of claim 1 wherein the communication medium is television.

14. The method of claim 1 wherein the communication medium is the Internet.

15. The method of claim 14 further including the step of providing a physical product to the player memorializing their selected portions of the second game.

16. The method of claim 15 wherein the physical product is a lottery ticket.

17. The method of claim 1 further including audience participation in the game show.

18. The method of claim 17 wherein the audience participation is via interactive video.

19. The method of claim 17 wherein the audience participation is via the internet.

20. The method of claim 17 wherein the audience participation is via inter active television.

21. A method for ancillary game play in a lottery comprising the steps of:

obtaining a pool of contestants to participate in the ancillary game, sequentially selecting a plurality of random numbers for use in the lottery, upon each sequential selection of a random number, comparing an additional attribute, beyond said random number for use in the lottery, associated with that selection versus corresponding attributes of the pool of contestants, permitting those contestants with matching attributes to the attribute of the selected random number to continue game play with the next random number selection, and continuing the selection of random numbers, comparing of attributes and permitting matches to continue until all random numbers are selected.

22. The method of claim 21 wherein the pool of contestants comprises lottery game players.

23. The method of claim 21 wherein the selection of numbers is mechanical.

24. The method of claim 23 wherein the mechanical selection utilizes balls.

25. The method of claim 24 wherein the balls are ping-pong balls.

26. The method of claim 22 wherein the selection of numbers is electrical.

27. The method of claim 26 wherein the electrical selection includes a random number generator.

28. The method of claim 21 wherein the ancillary game comprises a game of chance.

29. The method of claim 21 wherein the step of comparing an attribute associated with the random number selection is performed after the random numbers are selected.

\* \* \* \* \*